United States Patent Office 3,415,875
Patented Dec. 10, 1968

3,415,875
HYDROXYBENZOPHENONES CONTAINING SULFONIC ACID GROUPS
Christian Luethi, Munchenstein, Hans Rudolf Biland, Basel, and Max Duennenberger, Frenkendorf, Switzerland, assignors to Ciba Limited, Basel, Switzerland, a Swiss company
No Drawing. Filed May 31, 1966, Ser. No. 553,654
Claims priority, application Switzerland, June 4, 1965, 7,877/65
5 Claims. (Cl. 260—511)

ABSTRACT OF THE DISCLOSURE

New hydroxybenzophenone compounds having sulfonic acid groups are provided. The compounds of this invention are represented by the formula

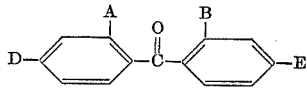

in which A and B are hydrogen atoms or hydroxyl groups and at least one of them is a hydroxyl group, D and E represent hydrogen atoms, halogen atoms, alkyl, phenyl or alkoxy groups or

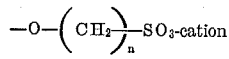

at least one of the two symbols representing

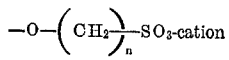

where $n=3$ or 4. The cation is preferably hydrogen, sodium, potassium, barium, calcium, tin, lead, cobalt, nickel, zinc, cadmium, manganese or copper, or the ammonium group.

The compounds of this invention are especially useful as stabilizers to protect organic materials against the harmful effects of heat and ultraviolet radiation.

---

The present invention provides hydroxybenzophenones that contain sulfonic acid groups and correspond to the formula (1)
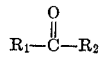

in which $R_1$ and $R_2$ represent benzene radicals of which at least one contains in ortho-position to the keto group a hydroxyl group and at least one contains in the para-position to the keto group a group of the composition —O-alkylene-$SO_3$-cation.

Thus, the compounds of the Formula 1 may contain one or more than one hydroxyl group and one or more than one group of the formula —O-alkylene-$SO_3$-cation. These substituents are present either in both or only in one of the two benzene radicals, provided that at least one hydroxyl group is in ortho-position to the keto group and at least one group —O-alkylene-$SO_3$-cation is in the para-position to the keto group.

The radicals $R_1$ and $R_2$ may contain further substituents, such as alkyl groups, phenyl groups, halogen atoms or alkoxy groups.

Particularly valuable compounds of the Formula 1 are those hydroxybenzophenones containing sulfonic acid groups which correspond to the formula (2)
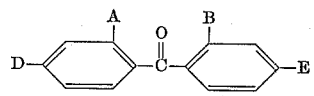

in which A and B are hydrogen atoms or hydroxyl groups and at least one of them is a hydroxyl group, and D and E represent hydrogen atoms, halogen atoms, alkyl, phenyl or alkoxy groups or

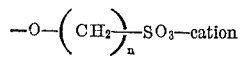

at least one of the two symbols representing

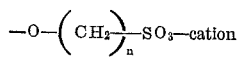

where $n=3$ or 4. The cation is preferably hydrogen, sodium, potassium, barium, calcium, tin, lead, cobalt, nickel, zinc, cadmium, manganese or copper, or the ammonium group.

Preferred compounds of this invention are benzophenones containing sulfonic acid groups, corresponding to the formula (3)
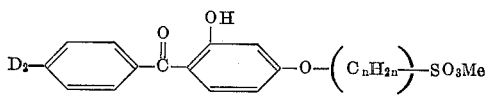

where $D_2$ represents a hydrogen or chlorine atom, a phenyl group, or an alkoxy group containing 1 to 3 carbon atoms; $n=3$ or 4, and Me represents one of the cations hydrogen, sodium, potassium, calcium, barium, zinc, cobalt, manganese or lead.

Particularly valuable are the compounds of the formula (4)
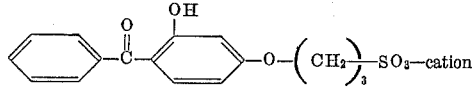

where the cation is hydrogen, potassium, sodium, zinc, cobalt, barium or manganese. Furthermore, there may be mentioned the sulfonic acid of the formula (5)
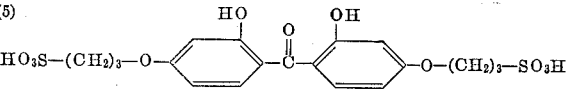

and its sodium salt.

The hydroxybenzophenones containing sulfonic acid groups of the Formula 1 are obtained when hydroxybenzophenones of the formula (6)
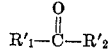

where $R'_1$ and $R'_2$ are benzene radicals of which at least one contains in ortho-position to the keto group and at least one in the para-position to the keto group a hydroxyl group are reacted with alkanesultones.

Particularly valuable starting materials of the Formula 6 are hydroxybenzophenones of the formula (7) 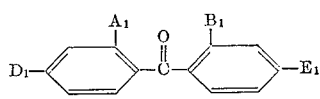

where $A_1$ and $B_1$ represent hydrogen or hydroxyl and at least one is a hydroxyl group, and $D_1$ and $E_1$ represent hydrogen, hydroxyl, alkyl, phenyl, halogen or alkoxy, at least one of these two symbols representing a hydroxyl group.

As examples of such hydroxybenzophenones there may be mentioned the 2,4-dihydroxybenzophenone of the formula (8) 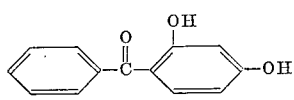

and the 2,2′,4,4′-tetrahydroxybenzophenone of the formula (9) 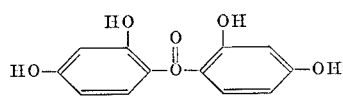

It is advantageous to use as condensation partner an alkanesultone of the formula

(10) 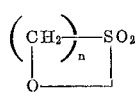

where $n=3$ or 4, that is to say propanesultone or butanesultone.

The condensation of the hydroxybenzophenones of the Formula 6 or 7, to be used as starting material, with the alkanesultone is advantageously carried out in an organic medium, for example in an organic solvent in which the alkanesultone is soluble but the hydroxyketone need not be. As examples of such solvents there may be mentioned acetone, alcohols such as ethanol or butanol, ethyleneglycol monomethyl ether, dioxane, and dimethylsulfoxide. Furthermore, the condensation is advantageously carried out in the presence of an acid acceptor such as an alkali metal hydroxide, carbonate or alcoholate, advantageously at an elevated temperature, for example at the boiling temperature of the solvent. Depending on the constitution of the hydroxybenzophenone and on the proportions of the starting materials used, one or more than one group —O—alkylene—SO₃—cation may be introduced.

By reacting the resulting alkali metal sulfonate with various water-soluble metal salts in an aqueous solution, further sulfonates can be manufactured. On the other hand, it is also possible to prepare the free sulfonic acids, for example by ion exchange, from the sulfonates, preferably the alkali metal sulfonates.

The new hydroxybenzophenones containing sulfonic acid groups obtained by the present process may be used as stabilizers towards the harmful effects of heat and ultraviolet radiation; a particularly valuable advantage achieved is that both effects materialize simultaneously, whereas in the past it was necessary to use mixtures of heat stabilizers and agents affording protection from ultraviolet radiation. The water-soluble compounds may be applied in the photo-technological sector, also in improving wool and in the lacquer and paint industry for the manufacture of water-soluble lacquers and emulsion paints, whereas the less readily water-soluble compounds, for example the heavy-metal salts of the new stabilizer type may be used as valuable auxiliaries for making plastics and lacquers.

Organic substances of high molecular weight, that can be protected from the harmful effects of heat and ultraviolet radiation by the substances of this invention, are, for example, the following types of materials:

Synthetic materials accessible by polymerization or copolymerization, for example polyacrylonitrile, polyvinylchloride or polyolefines such as polyethylene or polypropylene or those which are accessible by polycondensation, such as polyesters and above all polyamides; also polyadducts such as polyurethanes.

Lacquers and films of various compositions, for example those from acetylcellulose, cellulose propionate, cellulose butyrate or cellulose mixed esters, for example cellulose acetate-butyrate and cellulose acetate-propionate; furthermore nitrocellulose, vinylacetate, polyvinylchloride, polyvinylidenechloride; copolymers from vinylchloride and vinylidenechloride; alkyd resin lacquers; polyethylene, polypropylene, polyamides, polyacrylonitrile, polyesters, polycarbonates, polyurethanes and the like. Natural rubber-like materials such as rubber, balata, gutta percha or synthetic, vulcanizable materials such as polychloroprene, polysulfides, polybutadiene or copolymers of butadiene-styrene (for example Buna S) or butadiene-acrylonitrile (for example Buna N), which may further contain fillers, pigments, vulcanization accelerators and the like and in whose case the addition of the new hydroxybenzophenones containing sulfonic acid groups aims at delaying ageing and thus preventing changes in the plasticity properties and the embrittlement. Cosmetics such as perfumes, dyed or undyed soaps and bath salts, skin and face creams, powders, repellants and especially sunburn oils and creams.

The new hydroxybenzophenone-alkoxysulfonates may be incorporated with or applied to the substrates to be protected in a variety of ways depending on the nature of the latter.

For example, the protective agent may be incorporated with the synthetic, organic material of high molecular weight already during the final phase of the manufacture or working up of this material. Likewise, there is no difficulty connected with applying the protective agent to the surface layer or incorporating it in the final shaping operation of the finished product.

Furthermore, the protective agent may be incorporated with a substrate with a view to protecting one or more substances contained in it, for example dyestuffs, auxiliaries or the like, whereby at the same time the aforementioned protection of the high-molecular organic material is achieved.

Finally, the protective agent may be applied to the material to be protected, especially to fibrous materials of natural or synthetic origin, in any phase of the final processing such as the application of a dressing or a crease-resistant finish, a dyeing or finishing process or the like, by way of a fixing operation similar to a dyeing process. Thus, the protective agents of this invention are also very valuable for protecting organic textile materials, for example woven or knitted fabrics, fibre fleeces, napped substrates and the like.

Thus, the relevant process for protecting high-molecular organic substances from the harmful effects of ultraviolet radiation and at the same time from heat is characterized in that benzophenones containing sulfonic acid groups of the Formula 1 are incorporated with or fixed on the organic material to be protected itself or a substrate that contains the said material.

Depending on the kind of material to be treated, the demands made on the efficacy and durability and other factors, the amount of stabilizing agent, especially ultraviolet filter, to be incorporated with the material may vary within rather wide limits, for example from about 0.01 to 10%, preferably from 0.1 to 2%, referred to the weight of the material to be protected.

Unless otherwise indicated, parts and percentages in the following examples are by weight. Melting points are uncorrected.

Example 1

42.8 parts of 2,4-dihydroxybenzophenone and 11.3 parts of solid potassium hydroxide are suspended in 700 parts of acetone and at 20 to 25° C. a solution of 24.4 parts of 1,3-propanesultone in 250 parts of acetone is added. The suspension is then stirred for one hour at 20 to 25° C., then for one hour at 40° C. and finally for 17 hours under reflux, then cooled, suctioned and the filter cake is rinsed with acetone, to yield 71.3 parts of the compound of the formula

(11) 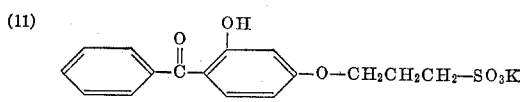

For purification the product is suspended in ethanol, and at the boiling temperature water is added until a clear solution results, which is then cooled and the compound crystallizes out; it is dried at 120° C. under vacuum, to yield 61 parts of an analytically pure material which melts above 300° C.

Calculated, $C_{16}H_{15}O_6SK$: C, 51.32; H, 4.04; S, 8.56%. Found: C, 51.36; H, 4.17; S, 8.49%.

Example 2

18.7 parts of the compound of the Formula 11 are dissolved at 20 to 25° C. in 325 parts of water. This solution is percolated through an ion exchange column in the H+ form (40 parts of "Dowex 50W," related to the dry weight) and eluted with water until the eluate displays a pH value of over 4. The collected aqueous solution is evaporated to dryness in a rotary evaporator. Yield: 16.2 parts of a yellow oil which solidifies to form light-yellow crystals when it is left standing. The compound of the formula

(12) 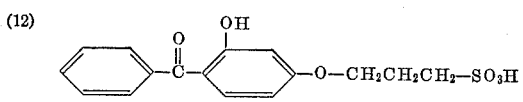

is extremely hygroscopic and very readily soluble in water.

Example 3

When 2,4,2',4'-tetrahydroxybenzophenone and double the molecular proportions of sodium hydroxide and 1,3-propane-sultone are reacted as described in Example 1, the compound of the formula

(13) 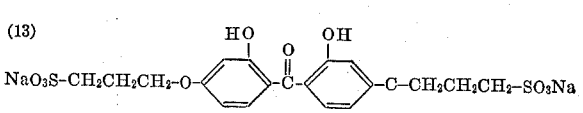

is obtained; it melts above 300° C.

Calculated, $C_{19}H_{20}O_{11}Na_2S_2$: C, 42.71; H, 3.77; S, 12.00; N, 8.60%. Found: C, 42.44; H, 4.06; S, 11.83; N, 8.35%.

Example 4

9.4 parts of the compound of the Formula 11 are dissolved with moderate heating in 100 parts of water, and a solution of 50 parts of zinc chloride in 25 parts of water is added. After about 30 minutes the zinc salt of 2-hydroxy-4-(γ-sulphopropoxy)-benzophenone begins to crystallize out; it is suctioned off, washed with 3×25 parts of ice water and then dried. The yield amounts to 10.3 parts.

(14) 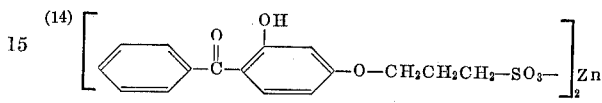

Melting point: 190 to 200° C. with decomposition.
Calculated, $C_{32}H_{30}O_{12}S_2Zn$: C, 52.22; H, 4.11; S, 8.71%. Found: C, 52.12; H, 4.37; S, 8.66%.

Example 5

When in Example 4 zinc chloride is replaced by a solution of 45 parts of cobalt sulfate heptahydrate in 50 parts of water, 10.1 parts of the corresponding cobalt salt are obtained.

(15) 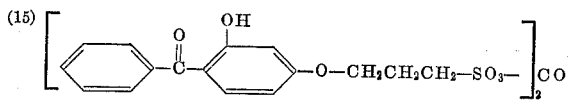

Melting point: 270 to 275° C.
Calculated, $C_{32}H_{30}O_{12}S_2Co$: C, 52.68; H, 4.14; S, 8.79%. Found: C, 52.77; H, 4.35; S, 8.83%.

Example 6

When in Example 4 zinc chloride is replaced by 80 parts of an aqueous manganese acetate solution saturated at 20° C., 9.1 parts of the corresponding manganese salt are obtained in a similar manner.

(16) 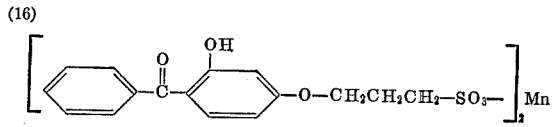

Melting above 330° C.
Calculated, $C_{32}H_{30}O_{12}S_2Mn$: C, 52.97; H, 4.17; S, 8.84%. Found: C, 52.92; H, 4.29; S, 9.10%.

In a manner similar to that described in the preceding examples the compounds listed in the following table may be prepared. In this table the columns contain:

Columns:
I ............ Formula number.
II ............ Structural formula.
III ............ Melting point in ° C. (uncorrected).
IV ............ Analysis [C; H; S] first line: calculated, second line: found empirical formula.
V ............ Recrystallization medium: 1=aqueous alcohol, 2=aqueous dimethylformamide.

TABLE

| I | II | III | IV | | | V |
|---|---|---|---|---|---|---|
| 17 | [structure: phenyl-C(O)-phenyl(OH)-O-(CH₂)₃-SO₃-]₂Pb·1H₂O | >300 | 42.8  3.6  7.1<br>42.8  3.7  7.2<br>C₃₂H₃₀O₁₂S₂Pb | | | 2 |
| 18 | [structure: phenyl-C(O)-phenyl(OH)-O-(CH₂)₃-SO₃-]₂Ba·1H₂O | >300 | 46.5  3.9  7.8<br>46.8  4.0  8.0<br>C₃₂H₃₀O₁₂S₂Ba | | | 2 |
| 19 | H₃CO-phenyl-C(O)-phenyl(OH)-O(CH₂)₃-SO₃Na | 290->340 | 52.6  4.4  8.3<br>52.2  4.4  8.3<br>C₁₇H₁₇O₇SNa | | | 1 |
| 20 | phenyl-phenyl-C(O)-phenyl(OH)-O-(CH₂)₃-SO₃K | >310 | 58.6  4.2  7.1<br>58.6  4.5  7.1<br>C₃₂H₁₉O₆SK | | | 1 |
| 21 | Cl-phenyl-C(O)-phenyl(OH)-O-(CH₂)₃-SO₃Na | >300 | 48.9  3.6  8.2<br>48.8  3.7  8.2<br>C₁₆H₁₄O₆ClSNa | | | 1 |
| 22 | [Cl-phenyl-C(O)-phenyl(OH)-O-(CH₂)₃-SO₂-]₂Ca | >330 | 49.3  3.6  8.2<br>49.4  3.8  8.1<br>C₃₂H₂₈O₁₂Cl₂S₂Ca | | | 2 |
| 23 | phenyl-C(O)-phenyl(OH)-O-(CH₂)₄-SO₃Na | >300 | 54.8  4.6  8.6<br>54.6  4.6  8.6<br>C₁₇H₁₇O₆SNa | | | 1 |

Example 7

12.5 parts of an aqueous solution containing 0.07 part of the compound of the Formula 11 are stirred into 87.5 parts of a gelatin solution (87 parts of dry gelatin in 1000 parts of water) heated at 50° C. A specimen of this mixture is poured over a plate of glass and dried for 20 hours at 50° C. under vacuum. In this manner a perfectly transparent film is obtained which, referred to its dry weight, contains 1% of the compound of the Formula 11 and which absorbs ultraviolet light up to about 360 mµ. It is no darker than a gelatin film cast without addition of the compound of the Formula 11.

Example 8

An acetylcellulose film about 50µ thick is produced by pouring an acetonic acetylcellulose solution of 10% strength containing 1% (referred to acetylcellulose) of the compound of the Formula 15. After drying, the film displays the following light transmission values in percent:

| Wave length in mµ | Light transmission in percent | |
|---|---|---|
| | Unexposed | Exposed for 100 hours in a fadeometer |
| 280 to 340 | 0 | 0 |
| 350 | 15 | 17 |
| 360 | 35 | 37 |
| 370 | 59 | 61 |
| 380 | 74 | 76 |

Example 9

A paste from 100 parts of polyvinylchloride, 59 parts by volume of dioctylphthalate and 0.1 part of the compound of the Formula 16 is rolled on a calender at 145 to 150° C. to form a foil about 0.5 mm. thick. The resulting polyvinylchloride foil absorbs ultraviolet rays completely within the region 280 to 350 mµ. When the foil is heated for 2 hours at 170° C., it turns much less yellow and brittle than a foil that does not contain the compound of the Formula 16.

Instead of the compound of the Formula 16 there may be used, for example, the compound of the Formula 15 or 18.

What is claimed is:

1. A hydroxybenzophenone of the formula

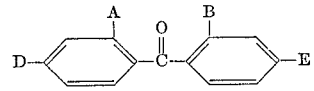

wherein A and B each represents a member selected from the group consisting of hydrogen and hydroxyl and at least one of them is hydroxyl, and D and E each represents a member selected from the group consisting of hydrogen, chlorine, phenyl, alkoxy having 1–3 carbon atoms and an —O—($C_nH_{2n}$)—SO₃—cation group, $n$ being a whole number selected from the group consisting of 3 and 4, the cation being selected from the group consisting of hydrogen, sodium, potassium, calcium, barium, tin, lead, cobalt, nickel, zinc, cadmium, copper, manganese and ammonium, and at least one of the symbols D and E representing said —O—($C_nH_{2n}$)—$SO_3$-cation group.

2. A hydroxybenzophenone according to claim 1 of the formula

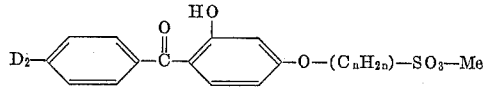

wherein $D_2$ represents a member selected from the group consisting of a hydrogen atom, a chlorine atom, a phenyl group and an alkoxy group containing 1 to 3 carbon atoms, $n$ is a whole number selected from the group consisting of 3 and 4, and Me represents a cation selected from the group consisting of hydrogen, sodium, potassium, calcium, barium, zinc, cobalt, manganese and lead.

3. A hydroxybenzophenone according to claim 1 of the formula

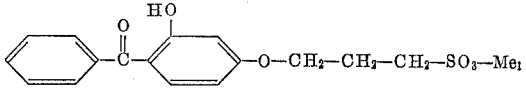

wherein $Me_1$ represents a cation selected from the group consisting of hydrogen, potassium, sodium, zinc, cobalt, barium, tin, lead, cobalt, nickel, zinc, cadmium, copper, 4. The hydroxybenzophenone according to claim 1 of the formula

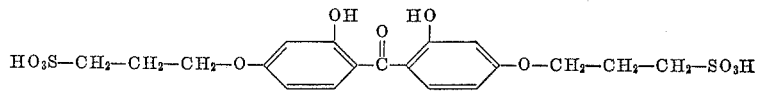

5. A sodium salt of a hydroxybenzophenone according to claim 1 of the formula

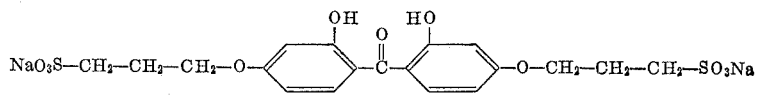

References Cited

UNITED STATES PATENTS

| | | | |
|---|---|---|---|
| 3,250,804 | 5/1966 | Cragoe | 260—511 |
| 3,265,722 | 8/1966 | Dudley | 260—512 |

DANIEL D. HORWITZ, *Primary Examiner.*

U.S. Cl. X.R.

260—429, 429.7, 435, 439, 429.9, 438.1, 799, 45.75, 49.95; 252—121; 117—161, 162, 139.5; 106—189; 167—90, 92, 94, 63

UNITED STATES PATENT OFFICE
CERTIFICATE OF CORRECTION

Patent No. 3,415,875                              December 10, 1968

Christian Luethi et al.

It is certified that error appears in the above identified patent and that said Letters Patent are hereby corrected as shown below:

Column 10, line 12, cancel ", tin, lead, cobalt, nickel, zinc, cadmium, copper," and insert -- and manganese --.

Signed and sealed this 31st day of March 1970.

(SEAL)
Attest:

Edward M. Fletcher, Jr.                        WILLIAM E. SCHUYLER, JR.
Attesting Officer                                    Commissioner of Patents